(12) United States Patent
Solf

(10) Patent No.: US 10,078,141 B2
(45) Date of Patent: Sep. 18, 2018

(54) TIMESTAMPING DETECTED RADIATION QUANTA

(71) Applicant: KONINKLIJKE PHILIPS N.V., Eindhoven (NL)

(72) Inventor: Torsten Solf, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 426 days.

(21) Appl. No.: 14/772,177

(22) PCT Filed: Feb. 28, 2014

(86) PCT No.: PCT/EP2014/053990
§ 371 (c)(1),
(2) Date: Sep. 2, 2015

(87) PCT Pub. No.: WO2014/135465
PCT Pub. Date: Sep. 12, 2014

(65) Prior Publication Data
US 2016/0011321 A1    Jan. 14, 2016

(30) Foreign Application Priority Data

Mar. 8, 2013 (EP) .................... 13158382

(51) Int. Cl.
*G01T 1/16* (2006.01)
*G01T 1/29* (2006.01)
(Continued)

(52) U.S. Cl.
CPC ............ *G01T 1/1606* (2013.01); *G01T 1/171* (2013.01); *G01T 1/20* (2013.01); *G01T 1/2985* (2013.01)

(58) Field of Classification Search
CPC .................................................. G01T 1/1606
(Continued)

(56) References Cited

U.S. PATENT DOCUMENTS

2007/0183459 A1\* 8/2007 Eidson ............... G01R 19/2509
370/498
2011/0095173 A1 4/2011 Menge et al.
(Continued)

FOREIGN PATENT DOCUMENTS

| JP | 2010217096 | 9/2010 |
|----|-----------|--------|
| WO | 2006111883 A2 | 10/2006 |
| WO | 2008079445 A2 | 7/2008 |

OTHER PUBLICATIONS

Frach, T., et al.; The Digital Silicon Photomultiplier Principle of Operation and Intrinsic Detector Performance; 2009; IEEE Nuclear Science Symposium Conference Record; pp. 1959-1965.
(Continued)

*Primary Examiner* — David Porta
*Assistant Examiner* — Carolyn Igyarto

(57) ABSTRACT

A radiation detection device, a system, a method, or a computer program product are used in timestamping detected radiation quanta. The device includes an optical detector pixel array, a timestamp trigger unit and a timing unit. The timestamp trigger unit determines a pixel cell triggering rate for pixel cells within the optical detector pixel array. The timestamp trigger unit causes the timing unit to generate a timestamp based on the pixel cell triggering rate.

15 Claims, 5 Drawing Sheets

(51) Int. Cl.
*G01T 1/17* (2006.01)
*G01T 1/20* (2006.01)

(58) Field of Classification Search
USPC .......................... 250/363.03, 252.1, 370.06
See application file for complete search history.

(56) References Cited

U.S. PATENT DOCUMENTS

| | | |
|---|---|---|
| 2013/0009063 A1 | 1/2013 | Henseler et al. |
| 2013/0020487 A1 | 1/2013 | Siegel et al. |
| 2013/0214168 A1 | 8/2013 | McDaniel et al. |
| 2014/0048711 A1 | 2/2014 | Henseler et al. |

OTHER PUBLICATIONS

Meijlink, J. R., et al.; First Measurement of Scintillation Photon Arrival Statistics Using a High-Granularity Solid-State Photosensor Enabling Time-Stamping of up to 20,480 Single Photons; 2011; IEEE Nuclear Science Symposium Conference Record; pp. 2254-2257.

\* cited by examiner

TIMESTAMPING DETECTED RADIATION QUANTA

FIELD OF THE INVENTION

The present invention relates to the timestamping of detected radiation quanta and finds application in high energy particle physics applications. Such applications encompass the direct detection of radiation quanta in the form of optical photons such as Cherenkov radiation, as well as the indirect detection of radiation quanta by means of the optical photons produced by a scintillator element. The invention finds particular application in PET imaging systems, and even more particularly the invention can be used in time-of-flight (TOF) PET imaging systems.

BACKGROUND OF THE INVENTION

In PET imaging a radiotracer is administered to a subject such as a patient or an animal prior to its positioning in the PET imaging region. The radiotracer is preferentially absorbed by regions in the subject and its distribution is imaged following an uptake period. Subsequently a clinician interprets the relative uptake in particular regions in the images such as organs and may perform a diagnosis of the subject. The radiotracer undergoes radioactive decay which results in the production of positrons. Each decay event produces one positron which travels up to a few mm in human tissue where it subsequently interacts with an electron in an annihilation event that produces two oppositely-directed gamma photons. The two gamma photons each have an energy of 511 keV and are subsequently detected by gamma photon detectors disposed radially around the PET imaging region which each produce an electrical signal when struck by an incident gamma photon. In a gamma photon detector, defined herein to comprise a scintillator element in optical communication with an optical detector, the scintillator element converts the high energy gamma photon into a scintillation light pulse comprising a number of optical photons, and the electrical signal is generated by the optical detector. A timestamp is issued to each electrical signal by a timestamping unit and compared to other timestamps in a coincidence determination unit. Two gamma photons are identified as coincident if their timestamps occur within a narrow time interval of each other; typically if they are within +/−3 ns. The positions of the two detectors receiving the coincident gamma photons define a line in space along which the annihilation event occurred, the line being termed a line of response (LOR). Such LORs are subsequently reconstructed to produce an image illustrative of the distribution of the radiotracer within the imaging region. In time-of-flight (TOF) PET the small time difference between the two detected gamma photons is further used to localize the position along the LOR at which the annihilation event occurred, and thus improve the spatial resolution of the reconstructed image. In depth-of-interaction (DOI) PET the trajectories of the two detected gamma photons may further be assessed in order to improve the spatial resolution of the reconstructed image by reducing parallax errors.

In PET imaging systems in general the timestamping unit that issues timestamps to the received gamma photons typically includes a timing unit such as a time-to-digital converter (TDC), and a timestamp trigger unit. The timing unit is caused by the timestamp trigger unit to generate a timestamp indicative of the time of reception of each gamma photon for subsequent analysis by the coincidence determination unit. The timestamp trigger unit causes the timing unit to generate a timestamp when a signal at its input exceeds a predetermined threshold and desirably occurs as soon as possible after the detection of the gamma photon in order to optimize the timing accuracy of the PET imaging system.

A timestamping unit used for timing purposes in the direct detection of radiation quanta such as Cherenkov radiation operates in much the same way. In the detection of Cherenkov radiation however the optical detector generates the electrical signal directly from the detected radiation quanta, thus in the absence of a scintillator element.

False triggering of the timing unit is a problem that can arise in systems employing so-called direct detection, as well as in systems employing indirect detection such as PET imaging systems, and is particularly acute in such which employ digital silicon photomultiplier (SiPM) detectors operating in the Geiger mode as the optical detector. Digital SiPM detectors suffer from dark count noise which manifests itself as spurious electrical pulses at the output of the optical detector in the absence of a valid event such as an optical pulse or a received gamma photon. The electrical pulses from dark count noise are frequently misinterpreted by the timestamp trigger unit and falsely cause the timing unit to generate a timestamp. Such false triggering results in a timing unit deadtime, a period of time during which the timing unit must be reset and during which it is unable to determine the time of reception of valid events. Dark count noise is strongly temperature dependent, and even at room temperatures can create considerable timing unit deadtime.

Some discrimination between dark count noise and the signals from valid events can be achieved by raising the timestamp trigger unit's threshold. This however has limited benefits since the discredited nature of the electrical pulses resulting from both dark count noise and from valid events risks that some valid events do not create a sufficiently large signal to trigger the timestamp trigger unit. The missing of valid events degrades the detection sensitivity. In PET imaging it degrades the system's signal to noise ratio. Raising the timestamp trigger unit's threshold has a further drawback of increasing the time delay between the reception of a valid event and the time of its timestamp, thereby degrading the timing accuracy of the timestamping unit.

Two further methods have also been introduced to mitigate the effects of dark count noise: cooling the optical detector and trigger validation. Cooling the optical detector reduces the dark count noise through its temperature dependence and is typically a requirement of such imaging systems. It requires the attachment of bulky cooling apparatus to the optical detectors which adversely impacts system size, cost and power requirements. Trigger validation has also been employed in the context of PET imaging. In this, electrical signals from optical detectors responsive to scintillation light pulses resulting from gamma photons are used to generate a trigger validation signal indicative that the trigger signal originated from a gamma photon as opposed to dark count noise. In a known triggering scheme disclosed in patent application WO2006/111883A2 a timestamp trigger unit causes a timing unit to generate a timestamp when the first optical photon in the scintillation light pulse has been detected. The trigger validation scheme issues a corresponding validity signal based on a logical AND/OR of several such optical detector signals which is true when a predetermined number of such optical detector signals subsequently exceed the threshold. A valid trigger of the timing unit consequent to the reception of a gamma photon is characterized by the detection of its scintillation light at multiple optical detectors and causes a true validity signal, resulting in the processing of the timestamp. By contrast dark count noise triggers fewer optical detectors and causes a false validity signal, resulting in the timestamp being rejected and the timing unit being reset.

These solutions however still suffer from the drawback that the optical detectors must be cooled in order to reduce the dark count noise to an acceptable level. Furthermore the timestamp trigger unit's high threshold restricts the achievable timing resolution.

SUMMARY OF THE INVENTION

It is an object of the invention to improve noise rejection in the timestamping of detected radiation quanta in high energy particle physics applications. It is a further object of the invention to improve the accuracy of timing such detected radiation quanta.

These objects are achieved by a radiation detection device comprising an optical detector pixel array, a timestamp trigger unit and a timing unit. A system, a method and a computer program product are also disclosed for achieving these objects. In the radiation detection device the optical detector pixel array comprises one or more pixel cells which can be triggered by optical photons. The timestamp trigger unit is in operative communication with the timing unit. The timestamp trigger unit receives signals from the optical detector pixel array and is configured to determine a pixel cell triggering rate for the one or more pixel cells within the optical detector pixel array. According to a first aspect of the invention the timestamp trigger unit is configured to cause the timing unit to generate a timestamp based on the pixel cell triggering rate for the one or more pixel cells within the optical detector pixel array. In a preferred implementation the timestamp is generated if the pixel cell triggering rate exceeds a predetermined rate. In other contemplated implementations a timestamp is generated if the pixel cell triggering rate is less than, is within a predetermined range of, or equal to a predetermined rate. This contrasts with the known method in which a timestamp trigger unit causes a timing unit to generate a timestamp when the first optical photon in a scintillation light pulse has been detected. The rejection of noise in the timing of detected radiation quanta is in general improved by discriminating, thus causing the timing unit to generate a timestamp, based on the pixel cell triggering rate because the light pulses characterizing their detection typically occur within a short time period. For example in PET imaging a scintillation light pulse resulting from the reception of a gamma photon by a scintillator element is characterized by a high initial rate of optical photon generation and thus a high pixel cell triggering rate whereas dark count noise is characterized by the triggering of pixel cells at a lower rate. In the so-called direct detection applications also envisaged the originating light pulse of interest occurs likewise as a short pulse of optical photons. By causing the timing unit to generate a timestamp based on a pixel cell triggering rate the timestamp trigger unit provides improved discrimination between electrical signals resulting from optical photons, and electrical signals caused by dark count noise. Since the timing unit generates a timestamp only when there is a high probability that the electrical signals originate from optical photons, the frequency with which the timing unit is reset consequent to it having been triggered to generate a timestamp by noise is reduced. Consequently the rejection of noise in the timestamping of detected radiation quanta is improved. In this way the timing unit's inherent reset time following a false trigger by noise is invoked less frequently and the timing unit is available for timestamping the detection of optical photons for a greater proportion of the time. A further advantage arising from the reduction in the frequency of falsely triggering the timing unit is the alleviation of the optical detector's cooling requirements. This is because the timing unit using the invention is capable of generating timestamps for the same proportion of the time yet at a higher temperature than existing methods. In PET imaging for example, owing to the high initial rate of optical photon generation in a scintillator element the triggering rate can also be assessed in a short time period, thereby permitting the rapid discrimination between a scintillation light pulse resulting from the reception of a gamma photon, and dark count noise. This furthermore improves the timing accuracy. A yet further advantage arising from the triggering of the timing unit based on a pixel cell triggering rate is that its improved noise rejection permits the generation of a timestamp following the detection of fewer optical photons. This makes it possible to reduce the timestamp trigger unit's trigger level to closer to the noise level of the optical detector, permitting the generation of a timestamp following the detection of for example the first optical photon, thereby improving the timing resolution of the timestamping unit.

According to another aspect of the invention a timestamp is generated if the pixel cell triggering rate exceeds a threshold rate value. Discrimination against dark count noise, which typically gives rise to a lower pixel cell triggering rate than that from an optical pulse resulting from a radiation quant, is improved by deciding to generate a timestamp based on the pixel cell triggering rate exceeding a threshold rate value.

According to another aspect of the invention the pixel cell triggering rate is determined by computing the number of triggered pixel cells within an optical detector pixel array within a predetermined delay period. The pixel cells may be single optical photon avalanche detector (SPAD), otherwise known as silicon photomultiplier (SiPM) pixel cells which have a digital output state which corresponds to whether the pixel cell has been triggered or not. Thus the rate may be determined by computing, thus counting, the number of pixel cells that have been triggered, thus set into a triggered state indicative of the detection of an optical photon, within a predetermined time period termed a delay period. The use of a predetermined delay period allows for discrimination of signals from the optical detector pixel array based on the time profile of triggered pixel cells.

According to another aspect of the invention a timestamp is generated based upon the meeting of a triggered pixel cell count condition prior to the meeting of a pixel cell triggering rate condition. The conditions may be for example that the triggered pixel cell count, or the pixel cell triggering rate, exceeds, is less than, is within a predetermined range of, or equal to a predetermined count, or rate, respectively. Advantageously the authenticity of signals from the optical detector array are improved prior to the generation of a timestamp, resulting in improved noise rejection.

According to another aspect of the invention a timestamp is generated if the triggered pixel cell count exceeds a threshold count value prior to the pixel cell triggering rate exceeding a threshold rate value. Furthermore the pixel cell triggering rate is determined by computing the number of triggered pixel cells within the optical detector pixel array (3a) within a predetermined delay period which begins when the triggered pixel cell count exceeds the threshold count value. Consequently a timestamp is generated if the triggered pixel cell count exceeds the threshold count value and then subsequently exceeds a higher count value before the end of the predetermined delay period such that the threshold rate value is exceeded. Advantageously the authenticity of signals from the optical detector array are improved prior to the generation of a timestamp, resulting in improved noise rejection.

According to another aspect of the invention a timestamp adjustment unit configured to receive the timestamp from the timing unit is further provided. The timestamp adjustment unit is configured to generate an adjusted first timestamp indicative of the time at which a predetermined triggered pixel cell count condition was met by subtracting the predetermined delay period from the time of the first timestamp. The subtraction may be carried out by a processor, for example within a control unit. Advantageously such a timestamp may be more reliably compared to other timestamps since the time of the timestamp is indicative of a reliable position on the profile of signals from the optical detector array. Such a timestamp is particularly useful in for example PET imaging in which the time of detection of a gamma quant may be more accurately determined.

According to another aspect of the invention the timestamp trigger unit causes the timing unit to generate a timestamp based further on a second pixel cell triggering rate determined at a later point in time. Such a system permits improved discrimination between electrical signals and dark count noise by basing the decision to generate a timestamp on a more accurately determined pixel cell triggering rate profile.

According to another aspect of the invention the timestamp trigger unit causes the timing unit to generate a timestamp if a first pixel cell triggering rate exceeds a first threshold rate and a second pixel cell triggering rate determined at a later point in time exceeds a second threshold rate. Such a system permits even further improved discrimination of signals by basing the decision to generate a timestamp on a more accurately determined profile of an optical pulse. In particular this permits the rejection of electrical pulses from scintillation light pulses that have inadequate energy to be indicative of a valid scintillation event.

According to another aspect of the invention a second timing unit is provided and the timestamp trigger unit is further configured to cause the second timing unit to generate a timestamp indicative of the time of detection of one or more optical photons by pixel cells within the optical detector pixel array. The timing information indicative of the time of detection of the one or more optical photons can be used to further improve the confidence that the signals from the optical detector pixel array resulted from a valid signal by permitting discrimination based on a more accurately determined optical pulse profile. Such information can be used by for example a PET imaging system to reject apparently timewise coincident quanta which by virtue of their optical pulse profile are in practice the result of scattering.

According to another aspect of the invention a second timing unit is provided and the timestamp trigger unit is configured to cause the second timing unit to generate a timestamp indicative of the time at which the pixel cell triggering rate meets a predetermined triggering rate condition. The triggering rate condition may for example be that the pixel cell triggering rate exceeds, is less than, is within a predetermined range of, or equal to a predetermined rate. The triggering rate information provided by the second timing unit can be used to further improve the confidence with which signals from the optical detector array are determined as indicative of a valid event, such as the reception of a radiation quant.

According to another aspect of the invention a PET imaging system is disclosed. The PET imaging system comprises a plurality of radiation detection devices in accordance with previous aspects and each radiation detection device further comprises a scintillator element in optical communication with the optical detector pixel array. The improved radiation detection devices advantageously improve the image quality in a PET imaging system.

According to another aspect of the invention a PET imaging system is disclosed. The PET imaging system comprises a plurality of radiation detection devices in accordance aspects of the invention having at least a second timing unit. Each radiation detection device further comprises a scintillator element in optical communication with the optical detector pixel array. The PET imaging system further comprises a depth-of-interaction calculation unit; wherein the depth-of-interaction calculation unit is configured to compute a depth of interaction of a radiation quant in the scintillator element based on the time difference between a first timestamp generated by a first timestamp unit and a second timestamp generated by a second timestamp unit. The depth of interaction may be determined from a lookup table or a statistical function relating time differences to a depth of interaction in the scintillator element. Such a lookup table or statistical function may be generated from heuristic or simulated time difference information based on the geometry of the scintillator element. Such computation may be carried out by a processor. Such information can be used by for example a PET imaging system to reject apparently timewise coincident quanta which by virtue of their trajectory are in practice the result of scattering.

According to another aspect of the invention a PET imaging system is disclosed. The PET imaging system comprises a plurality of radiation detection devices in accordance aspects of the invention having at least a second timing unit. Each radiation detection device further comprises a scintillator element in optical communication with the optical detector pixel array. The PET imaging system further comprises a timestamp correction unit; wherein the timestamp correction unit is configured to compute a corrected timestamp based on a weighted average of a first timestamp generated by a first timing unit and a second timestamp generated by a second timing unit. The weighted average may be determined from a lookup table or a statistical function relating time differences between timestamps and provides a more accurate timestamp based on the two input timestamps. Such a lookup table or statistical function may be generated from heuristic or simulated timestamps based on the geometry of the scintillator element. Such computation may be carried out by a processor. Such information can be used by for example a PET imaging system to reduce timing jitter.

According to another aspect of the invention a timing method is provided. The timing method may be used in for example PET imaging or Cherenkov imaging. The timing method comprises the steps of i) receiving signals from an optical detector pixel array indicative of the triggering of one or more pixel cells within the optical detector pixel array ii) determining at least a first pixel cell triggering rate for the one or more pixel cells within the optical detector pixel array and iii) generating a first timestamp indicative of the detection of a radiation quant based on the at least a first pixel cell triggering rate for the one or more pixel cells within the optical detector pixel array. The timing method may optionally include additional methods steps disclosed in accordance with other aspects of the invention.

According to another aspect of the invention a computer program product comprising computer executable instructions to perform the method steps in accordance with the timing method aspect of the invention is disclosed. The computer program product may be a computer-readable storage medium, such as a floppy disc, a magnetic hard drive, a USB drive, an optical disc, ROM or RAM and furthermore the computer executable instructions may be downloadable.

According to another aspect of the invention, in the radiation detection device the timing unit is a time to digital converter. A time to digital converter typically offers improved temporal accuracy over an analogue time converter, improving the accuracy of timing the detection of radiation quanta.

According to another aspect of the invention, in the radiation detection device the pixel cells within the optical detector pixel array are silicon photomultiplier (SiPM) pixel cells. Such pixel cells have a fast response and offer good timing accuracy when used in the detection of radiation quanta.

According to another aspect of the invention, in the radiation detection device a pixel cell triggering rate for the one or more pixel cells within the optical detector pixel array is determined within a time interval in the range 0.001 ns to 200 ns. Such a time interval enables the rapid discrimination between dark count noise and the scintillation pulse resulting from a radiation quant.

According to another aspect of the invention, in the radiation detection device a pixel cell trigging rate for the one or more pixel cells within the optical detector array is determined within a time interval in the range 0.001 ns to 200 ns subsequent to the detection of one or more optical photons by pixel cells within the optical detector pixel array. The detection of a particular number of optical photons prior to the determination of the rate permits the triggering from a predetermined point in the profile of the optical pulse thereby providing repeatable timing performance.

According to another aspect of the invention a radiation detection device further includes a validation logic unit. The validation unit is configured to receive signals from the optical detector pixel array and further configured to determine the number of triggered pixel cells within at least a portion of the optical detector pixel array. The validation logic unit is configured to generate a validation signal indicative of a valid timestamp based on the number of triggered pixel cells within the portion of the optical detector pixel array. The number of triggered pixel cells may for example be determined by serially shifting the digital states of the pixel cells in the pixel cell array into a parallel adder. Through the validation provided, such a configuration advantageously improves the discrimination between a scintillation light pulse and dark count noise.

DETAILED DESCRIPTION OF THE INVENTION

In order to improve noise rejection in the timestamping of detected radiation quanta in high energy particle physics applications the present invention comprising a radiation detection device is provided. A system, a method and a computer program product are also provided. The radiation detection device comprises an optical detector pixel array, a timestamp trigger unit and a timing unit is described with reference to gamma photon detection in a PET imaging system. Particular reference is made to an implementation in which the timing unit is a time to digital converter (TDC) although it is to be appreciated that other forms of timing unit such as an analogue timing unit may alternatively be employed. It is to be further appreciated that the invention also finds application in the broader field of high energy particle physics including for example the direct detection of Cherenkov radiation.

In PET imaging the detection of gamma photons is carried out by a plurality of gamma photon detectors. Such gamma photon detectors are typically disposed around a PET imaging region in order to receive gamma photons therefrom. In operation, each gamma photon detector, comprising a scintillator element in optical communication with an optical detector, responds to the reception of a gamma photon by the creation of a scintillation light pulse in the scintillator element. The optical detector, which may be an optical detector pixel array comprising one or more pixel cells that can be triggered by the optical photons responds to the detection of the optical photons by generating electrical signals. The process of timing the reception of gamma photons is fundamental to PET imaging in which the originating positions of gamma photons are determined through coincidence. This timing process is typically performed by one or more timestamping units wherein a timestamping unit assigns timestamps to received gamma photons. The timing unit and timestamp trigger unit of the present invention find application within a timestamping unit of a PET imaging system in which they cooperate to generate timestamps corresponding to the time of detection of each gamma photon. In the present invention the timestamp trigger unit is configured to receive electrical signals from the optical detector pixel array and is further configured to determine at least a first pixel cell triggering rate for the one or more pixel cells within the optical detector pixel array. Furthermore the timestamp trigger unit is configured to cause the timing unit to generate a timestamp based on the at least a first pixel cell triggering rate for the one or more pixel cells within the optical detector pixel array. Consequently a timestamp is generated based on a first pixel cell triggering rate, thus based on an optical photon detection rate.

Figure 1:
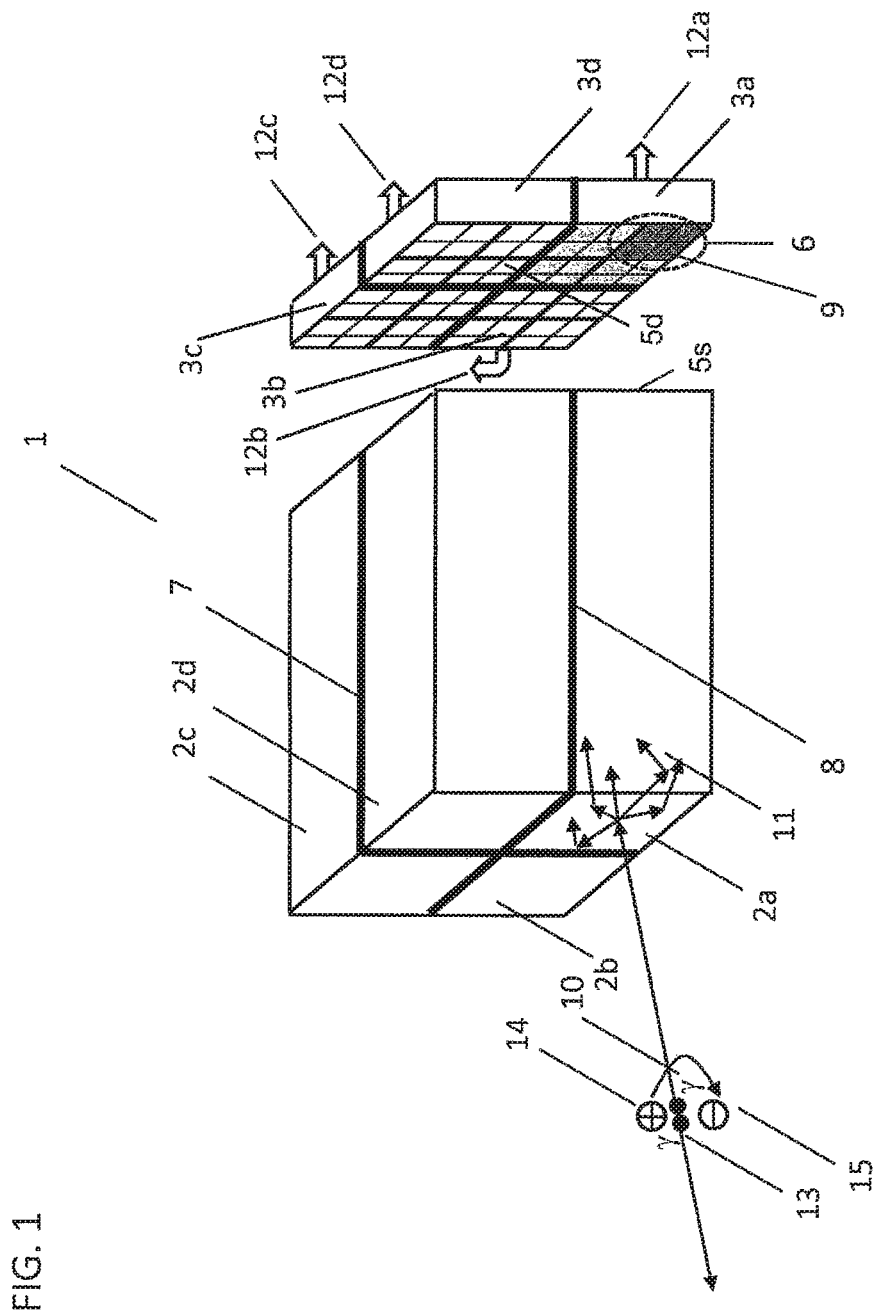
FIG. 1 illustrates a plurality of gamma photon detectors in accordance with certain aspects of the invention.

FIG. 1 illustrates a plurality of gamma photon detectors in accordance with certain aspects of the invention. In FIG. 1 a plurality of gamma photon detectors 1 is shown wherein each gamma photon detector comprises a scintillator element 2a, 2b, 2c or 2d in optical communication with a corresponding optical detector pixel array 3a, 3b, 3c, or 3d. For ease of illustration only four gamma photon detectors 1 are shown in FIG. 1, and it is to be appreciated that the construction may be repeated in order to receive gamma photons from an enlarged reception area. The plurality of gamma photon detectors 1 may for example be disposed around the imaging region of a PET imaging system. For ease of illustration, scintillator elements 2a, 2b, 2c, 2d in FIG. 1 are illustrated as being separated from their corresponding optical detector pixel array 3a, 3b, 3c, 3d; however in practice face 5s of exemplary scintillator element 2a and face 5d of its corresponding optical detector pixel array 3a may be in intimate contact, or optically coupled by means of an optically index-matching layer in order to facilitate optical communication between the two. Furthermore in FIG. 1, the individual scintillator elements exemplified by 2a, 2b, 2c, 2d are optically isolated from one another by means of reflective and light barrier layers 7, 8 in order to prevent the coupling of scintillation light between neighboring scintillator elements. Such reflective and light barrier layers 7, 8 may also be used on all surfaces of scintillator elements 2a, 2b, 2c, 2d other than the optical interface with the optical detector pixel array shown in FIG. 1. In this way, scintillation light generated within a scintillator element is retained within that scintillation element until it is detected by its corresponding optical detector pixel array. In operation, a gamma photon detector, exemplified by scintillator element 2a and its corresponding optical detector pixel array 3a shown shaded in FIG. 1, is responsive to the reception of radiation quanta such as gamma photon 10. Gamma photon 10 may be one of a pair of oppositely-directed gamma photons 10, 13 formed as a consequence of an annihilation event following radioactive decay, wherein the radioactive decay produces positron 14 and is annihilated by electron 15. The source of the radioactive decay may be for example a radiotracer. The reception of gamma photon 10 by scintillator element 2a results in the generation of scintillation light 11 which is retained within scintillator element 2a by a combination of total internal reflection and reflective layers 7, 8 until its detection by optical detector pixel array 3a, resulting in electrical signals at array electrical output 12a. Optical detector pixel array 3a comprises one or more optical detector pixels 6, shown as dark shaded in FIG. 1, wherein each optical detector pixel 6 comprises one or more pixel cells 9. The smallest optical detector element is therefore a pixel cell 9 which may be for example a silicon photomultiplier (SiPM) connected in the Geiger mode.

Figure 2:
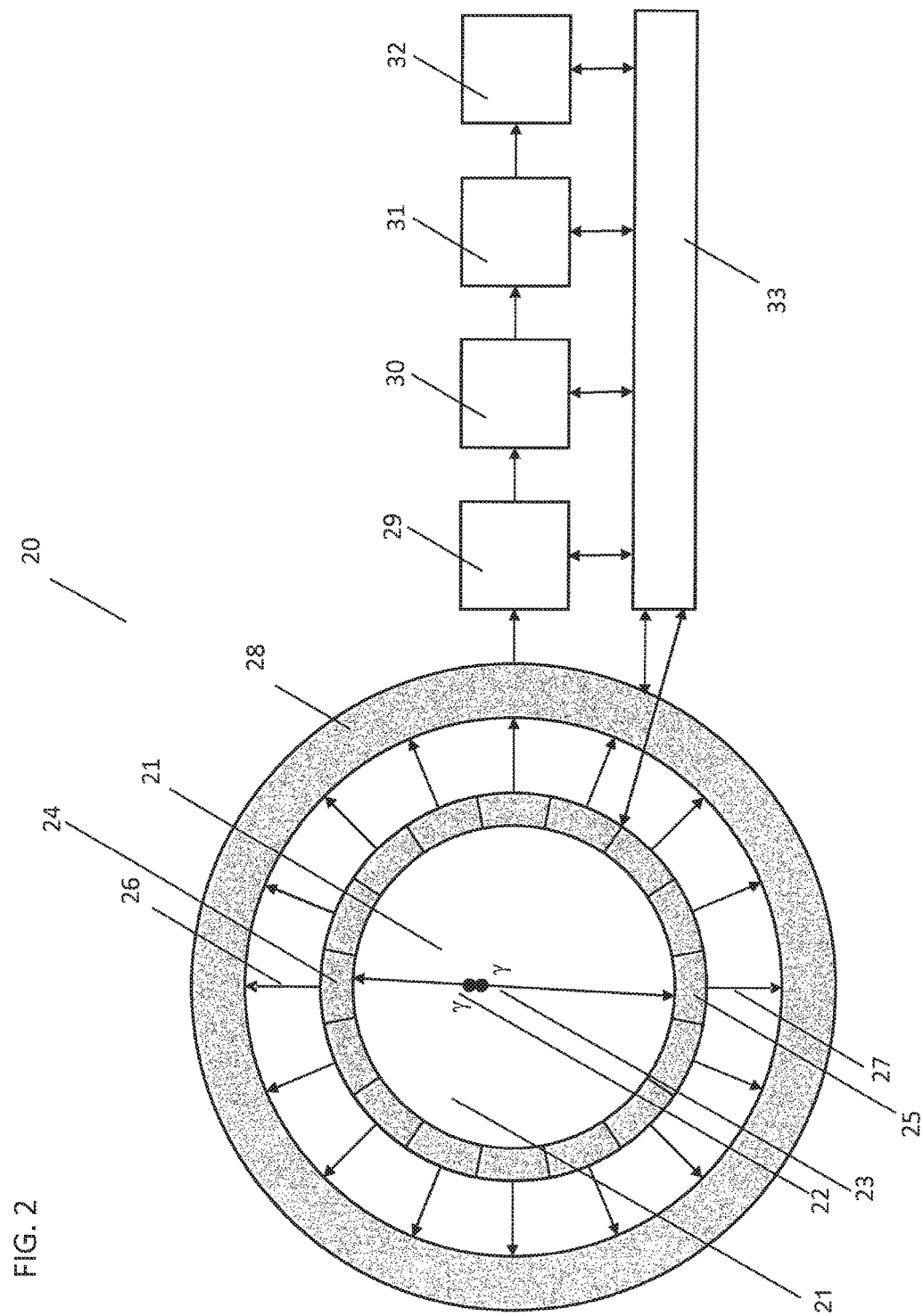
FIG. 2 illustrates an exemplary PET imaging system in accordance with certain aspects of the invention.

FIG. 2 illustrates an exemplary PET imaging system in accordance with certain aspects of the invention. The exemplary gamma photon detectors of FIG. 1 may for example be used in the system illustrated in FIG. 2. In FIG. 2, PET imaging system 20 comprises a plurality of gamma photon detector modules, or more specifically gamma photon detector modules 24, 25 disposed about imaging region 21. Each gamma photon detector module 24, 25 may comprise one or more gamma photon detectors such as the gamma photon detector formed by the combination of items 2a and 3a in FIG. 1. Each gamma photon detector within gamma photon detector module 24, 25 produces electrical signals indicative of the reception of gamma photons, the electrical signals from which are received by timestamping unit 28 via a bus. Whilst illustrated as a single unit, timestamping unit 28 may be replicated such that one or more timestamping units are associated with each gamma photon detector module 24 thereby providing timestamping functionality locally to the gamma photon detector at which a gamma photon is received. In operation the detection of exemplary gamma photons 22, 23 by gamma photon detector modules 24, 25 respectively results in electrical signals that are received by timestamping unit 28 via bus 26, and bus 27 respectively.

Each bus 26, 27 represents the one or more array electrical outputs 12a, 12b, 12c, 12d in FIG. 1 of the one or more gamma photon detectors within each gamma photon detector module 24, 25. Returning to FIG. 2, timestamping unit 28 issues at least a timestamp indicative of the time of reception of each received gamma photon. An integration unit may be further included within timestamping unit 28 to integrate the scintillation light associated with each gamma photon in order to determine its energy. Timestamping unit 28 is in communication with coincidence determination unit 29 which identifies received gamma photons as coincident if their timestamps occur within a narrow time interval of each other, typically +/−3 ns. Coincidence determination unit 29 may further analyze the energy associated with each received gamma photon and reject apparently coincident gamma photons which have a gamma photon energy lying outside a predetermined energy window. Coincidence determination unit 29 is in communication with reconstruction processor 30 which constructs a line of response for each pair of received photons deemed coincident and further processes multiple such lines of response in order to reconstruct data representing an image of the originating positions of the coincident gamma photons. In time of flight (TOF) PET the reconstruction processor may further take into account the small time difference between received coincident gamma photons in order to better localize their originating position. In depth-of-interaction (DOI) PET the trajectories of the two detected gamma photons may further be assessed in order to improve the spatial resolution of the reconstructed image by reducing parallax errors. Reconstruction processor 30 is in further communication with image processing unit 31 which is configured to process the data representing the originating positions of the coincident photons into a format suitable for presentation of an image on an output device. Image processing unit 31 is in further communication with output device 32 which presents an image, such as a display, a printer and the like. Control unit 33 is in communication with all described units of the PET imaging system and coordinates the operations described above.

When in use, a portion of a subject to be imaged such as portion of a human or animal body is positioned in imaging region 21 of the exemplary PET imaging system in FIG. 2. The portion may be an organ within a subject in which it is desired to measure the uptake of a radiotracer. Prior to the positioning of the portion of the subject in the imaging region 21, a radiotracer may be administered to the subject, and an uptake period may be permitted to lapse. During the imaging process a plurality of gamma photon detectors 1 receive gamma photons resulting from radioactive decay events within the imaging region 21, for example from the decay of a radiotracer administered to a subject. Following the imaging process PET imaging system 20 produces an image indicative of the distribution of the radiotracer within imaging region 21. The timing unit and timestamp trigger unit of the present invention find application within timestamping unit 28 in FIG. 2.

Figure 3:
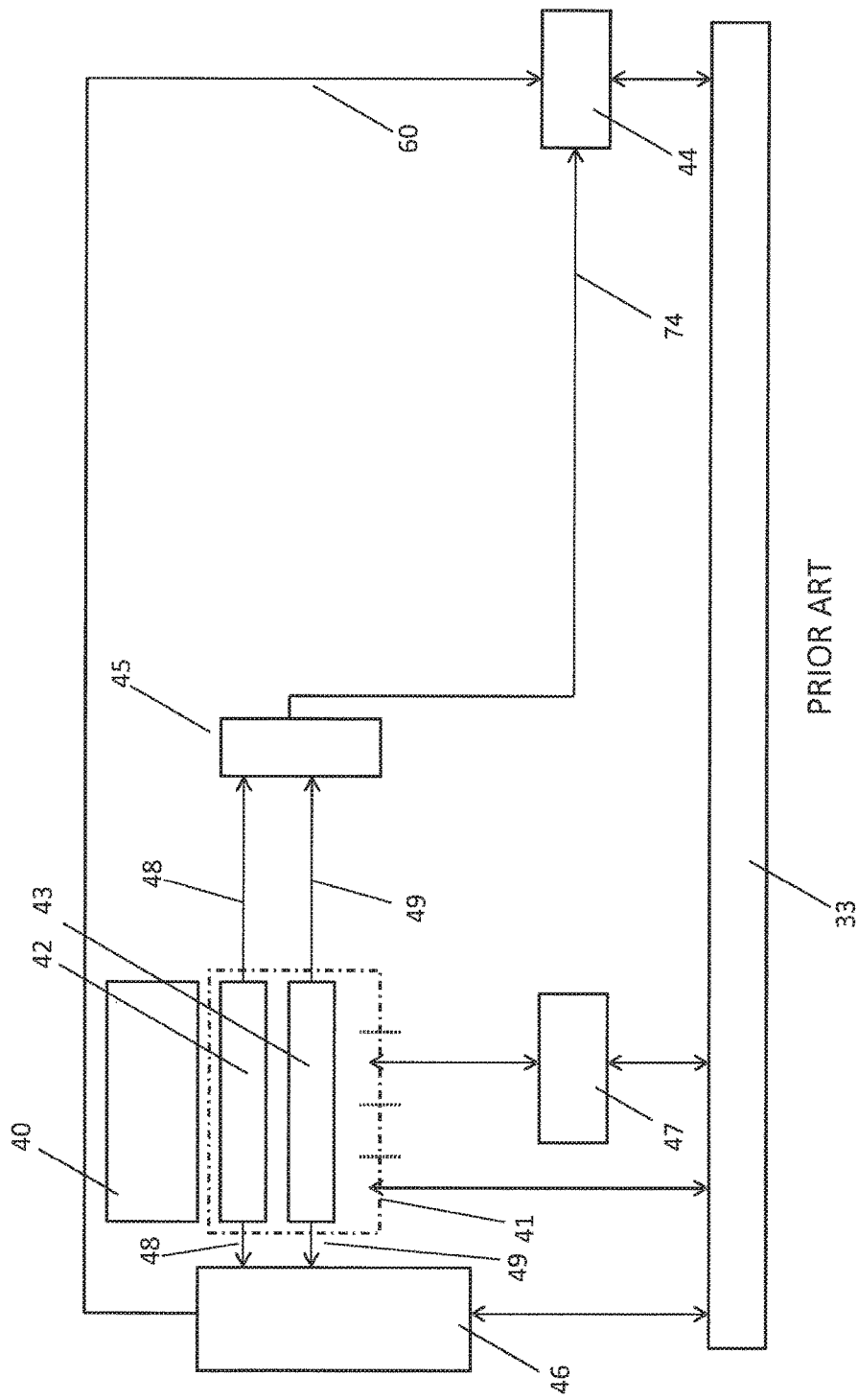
FIG. 3 illustrates a prior art timing scheme used in a Philips Digital Photon Counting (PDPC) PET imaging system.

In order to highlight the benefits of the present invention, FIG. 3 illustrates a prior art timing scheme used in a Philips Digital Photon Counting (PDPC) PET imaging system. Such a system is disclosed in patent application WO2006/111883A2. In prior art FIG. 3, scintillator element 40 is in optical communication with optical detector pixel array 41 to form a gamma photon detector. A plurality of such gamma photon detectors may be used in the PET imaging system 20 illustrated in FIG. 2. Returning to prior art FIG. 3, scintillation light generated within scintillator element 40 is detected by pixel cells within optical detector pixel array 41. Optical detector pixel array 41 comprises one or more optical detector pixels wherein each optical detector pixel comprises one or more pixel cells. A pixel cell may be a single optical photon avalanche detector (SPAD), otherwise known as a silicon photomultiplier (SiPM), and may be operated in the Geiger mode. In operation a SiPM, or a pixel cell is initially reset such that its output is in a logical false state. The reception of an optical photon by a SiPM results in the breakdown of its junction and the triggering of a logical true state at its output. The smallest optical detector element in optical detector pixel array 41 is therefore a pixel cell wherein each pixel cell can be enabled and disabled individually and its logical output can be read out. In one configuration an optical detector pixel has a pitch of approximately 4 mm and a pixel cell has a pitch of approximately 50 microns. An optical detector pixel may therefore comprise thousands of pixel cells, although implementations with one or more pixel cells are also contemplated. Pixel cells within optical detector pixel array 41 are arranged in rows, as exemplified by pixel cell rows 42, 43 of which only two are shown for ease of illustration. There may be one or more such pixel cell rows. A logical OR operation (not shown) is further performed on the outputs of one or more pixel cells in a pixel cell row 42, 43 and used to generate a row trigger signal at row trigger outputs 48, 49. A row trigger output 48, 49 is therefore set into a logical true state when one or more of the pixel cells in its pixel cell row 42, 43 have been triggered into a logical true state. By way of exemplary reference to FIG. 1, scintillator element 40 corresponds to item 2a; optical detector pixel array 41 corresponds to item 3a.

Returning to prior art FIG. 3; a timing unit, implemented as time to digital converter (TDC) 44, generates a timestamp indicative of the time of reception of a gamma photon by scintillator element 40 when triggered by trigger logic unit 45. Validation output 60 of validation logic unit 46 controls the output of the timestamp to control unit 33 such that if the electrical signals at row trigger outputs 48, 49 appear to result from a gamma photon the timestamp is output to control unit 33, and if not, the timestamp is not output and the TDC is reset. Optional integrator unit 47 may be used to determine the energy of each received gamma photon by integrating the scintillation light produced in response to its reception. The gamma photon energy is a useful parameter in applications such as PET imaging in which a coincidence determination unit may use it to improve the discrimination between scattered and non-scattered gamma photons and thereby determine the validity of a line of response. Optional integrator unit 47 may be configured to generate a signal indicative of the total amount of scintillation light detected by the pixel cells within optical detector pixel array 41. The integration by integrator unit 47 may be initiated via control unit 33 when trigger logic unit 45 causes TDC 44 to generate a timestamp. Optional control unit 33 may coordinate the various operations described above, may further receive timestamps from TDC 44 and may further control their transfer to coincidence determination unit 29 within PET imaging system 20 illustrated in FIG. 1.

In operation, the reception of a gamma photon by scintillator element 40 in prior art FIG. 3 results in the generation of a scintillation light pulse comprising a large number of optical photons. The optical photons are detected by pixel cells within optical detector pixel array 41 resulting in a logical true state at row trigger outputs 48, 49 if one or more pixel cells in its corresponding pixel cell row 42, 43 detects an optical photon. Scintillation light is characterized by the detection of its optical photons by pixel cells from multiple pixel cell rows 42, 43 and is therefore characterized by a logical true state at multiple row trigger outputs 48, 49. Trigger logic unit 45 performs a logical operation on multiple row trigger outputs 48, 49 in order to generate a signal at TDC trigger connection 74 which causes TDC 44 to generate a timestamp when a predetermined logic condition is fulfilled. It is typically desired to generate a timestamp when as few row trigger outputs 48, 49 as possible are in a logical true state in order to optimize the sensitivity of the detection. The lowest trigger threshold is therefore achieved by configuring trigger logic unit 45 as an OR logic unit in which TDC trigger connection 74 causes TDC 44 to generate a timestamp when one or more of the row trigger outputs 48, 49 are in a logical true state. Such a configuration corresponds to the generation of a timestamp upon the detection of the first optical photon. Alternative, higher thresholds with improved dark count noise rejection can also be achieved by realizing trigger logic unit 45 with a combination of AND and OR logic having as inputs a predetermined selection of row trigger outputs 48, 49.

Validation logic unit 46 in prior art FIG. 3 includes logic circuitry which receives signals from row trigger outputs 48, 49 indicative of the detection of optical photons in pixel cell rows 42, 43 in order to determine whether these signals originated from a gamma photon. Validation logic unit 46 generates a true signal at validation output 60 when a predetermined number of row trigger outputs 48, 49 in optical detector pixel array 41 have been set into a true state indicative of the detection of one or more optical photons by pixel cells in a corresponding pixel cell row 42, 43. The threshold number of pixel cells required to change the state of validation output 60 is higher than that required by trigger logic unit 45 to cause TDC 44 to generate a timestamp. In this way, validation logic unit 46 provides discrimination against noise which typically sets a low total number of pixel cells within optical detector pixel array 41 into a true state, and a scintillation light pulse which sets a much higher total number of pixel cells within optical detector pixel array 41 into a true state. If validation logic unit 46 confirms that the predetermined number of row trigger outputs 48, 49 have been set into a true state, the scintillation light pulse is interpreted as originating from a gamma photon and validation output 60 causes TDC 44 to output the timestamp to control unit 33. The timestamp which was produced when triggered by trigger logic unit 45 is then transferred to control unit 33 from a register (not shown). If validation logic unit 46 does not confirm that the predetermined number of row trigger outputs 48, 49 have been set into a true state then the timestamp is not transferred to control unit 33 and the TDC 44 and integrator unit 47 are reset via control unit 33.

As stated earlier, a drawback of SiPM optical detectors is the high dark count noise inherent in their Geiger mode operation. When used in a gamma photon detector such as that illustrated in prior art FIG. 3, electrical signals at row trigger outputs 48, 49 caused by dark count noise have similar characteristics to the electrical signals resulting from the detection of a gamma photon, confounding discrimination between the two. Dark count noise in pixel cells within pixel cell rows 42, 43 may therefore cause trigger logic unit 45 to cause TDC 44 to generate a timestamp, and correctly fail to set validation output 60 of validation logic unit 46 into a true state and thereby cause TDC 44 to output the timestamp to control unit 33. In this case TDC 44 is reset in preparation for generating the next timestamp. In the prior art system of FIG. 3 the reset of the TDC takes some 50 ns.

Consequently a false trigger of TDC 44 results in a "deadtime" of approximately 50 ns during which it cannot generate a timestamp. Dark count noise in such optical detectors used in PET imaging has been found to reach 10 million pulses per second at room temperature, so when trigger logic unit 45 is configured to start TDC 44 with its lowest possible threshold, thus upon detection of the first optical photon, the deadtime amounts to 50%. Consequently TDC 44 is unable to issue timestamps for 50% of the time, degrading the sensitivity to gamma photons. In the prior art system illustrated in FIG. 3, noise discrimination is provided through the thresholds to the number of row trigger outputs 48, 49 that are required to cause both trigger logic unit 45, and validation logic unit 46 to have true output states respectively. In spite of this the optical detectors must also be cooled to reduce the dark count noise in order that its interruptions do not interfere with the timing of gamma photons.

In the present invention a different approach is taken to improve noise rejection in the timing of detected radiation quanta. In the present invention a timing unit, exemplified by a TDC, is caused to generate a timestamp by a timestamp trigger unit based on a pixel cell triggering rate within the optical detector pixel array, thus based on an optical photon detection rate. The inventor has found that causing a timing unit to generate a timestamp based on a pixel cell triggering rate provides improved discrimination between the triggering of pixel cells by optical photons and by dark count noise. Consequently the frequency with which dark count noise causes the timing unit to generate a timestamp is reduced, and the proportion of time during which the timing unit is disabled by noise-triggered deadtime is reduced. The timing unit is therefore able to timestamp the reception of gamma photons for a greater proportion of the time. The improved time utilization of the timing unit advantageously alleviates the cooling requirements of the optical detectors. The reduced activity of the timing unit also reduces its own power consumption thereby reducing the temperature of the nearby optical detectors, further reducing their dark count noise. The improved timing method furthermore has improved timing accuracy which improves image resolution when used in a PET imaging system.

By contrast the system in prior art FIG. 3 is configured such that the timing unit implemented by TDC 44 generates a timestamp when a predetermined number of optical detector pixel cells have been triggered.

Figure 4:
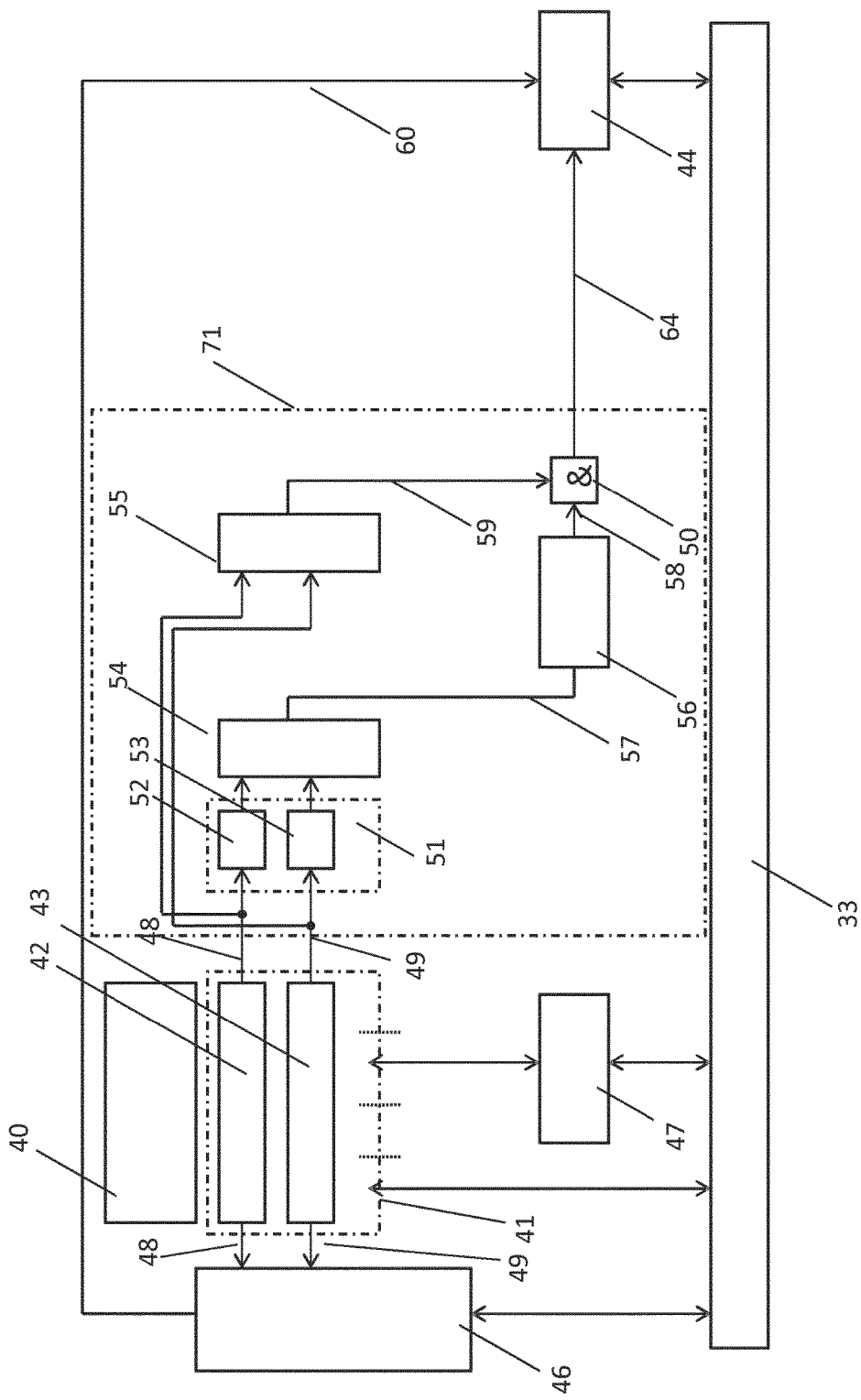
FIG. 4 illustrates a first embodiment of a timing unit and timestamp trigger unit in accordance with certain aspects of the invention.

FIG. 4 illustrates a first embodiment of a timing unit and timestamp trigger unit 71 in accordance with certain aspects of the invention. In FIG. 4, scintillator element 40 is in optical communication with optical detector pixel array 41 to form a gamma photon detector. Scintillation light generated within scintillator element 40 is detected by optical detector pixel array 41. A plurality of such gamma photon detectors may be used in the PET imaging system 20 illustrated in FIG. 2. Optical photons from for example Cherenkov radiation may be directly detected in the same way although in the absence of scintillator element 40. Optical detector pixel array 41 comprises one or more optical detector pixels, each comprising one or more pixel cells. A pixel cell may be a single optical photon avalanche detector (SPAD), otherwise known as a silicon photomultiplier (SiPM), and may be operated in the Geiger mode in which the reception of an optical photon results in the breakdown of the junction and a logical true state at the pixel cell output. In operation a SiPM, or a pixel cell is initially reset such that its output is in a logical false state. The reception of an optical photon by a SiPM results in the breakdown of its junction, thereby triggering its output to change to a logical true state. The smallest optical detector element in optical detector pixel array 41 is therefore a pixel cell wherein each pixel cell can be enabled and disabled individually and its logical output can be read out. In one configuration an optical detector pixel has a pitch of approximately 4 mm and the pixel cells are arranged in rows with a pitch of approximately 50 microns. An optical detector pixel may therefore comprise thousands of pixel cells, although implementations with one or more cells are also contemplated. The pixel cells within optical detector pixel array 41 may be arranged in rows, as exemplified by pixel cell rows 42, 43 in FIG. 4 of which only two rows are shown for ease of illustration. There may be one or more such pixel cell rows. A logical OR operation (not shown) is further performed on the outputs of one or more pixel cells in a pixel cell row 42, 43 and used to generate a row trigger signal at row trigger outputs 48, 49. A row trigger output 48, 49 is therefore set into a logical true state when one or more of the pixel cells in its pixel cell row 42, 43 are in a logical true state. By way of exemplary reference to FIG. 1, scintillator element 40 corresponds to item 2a; optical detector pixel array 41 corresponds to item 3a. Returning to FIG. 4; a timing unit exemplified by TDC 44 generates a timestamp indicative of the time of reception of a gamma photon by scintillator element 40 when AND logic 50 generates a logical true state at TDC trigger connection 64. An alternative timing unit such as an analogue timing unit may also be used to implement the timing unit. Pulse shortening unit 51 comprises one or more monostables 52, 53, each configured to receive electrical signals from a pixel cell row 42, 43 and to generate a logical true output pulse when a signal at its corresponding row trigger output 48, 49 indicates that one or more pixel cells in its corresponding pixel cell row 42, 43 have been triggered into a true state indicative of the detection of an optical photon. The period of the monostable pulse may be in the range 0.001 ns to 10 ns, is preferably in the range 0.001 ns to 5 ns, and is even more preferably in the range 0.001 ns to 1 ns, and most preferably in the range 0.001 ns to 0.5 ns. In this way a monostable 52, 53 generates a logical true output pulse when a single optical photon has been detected by a pixel cell in its corresponding pixel cell row 42, 43. The electrical outputs of monostables 52, 53 in pulse shortening unit 51 are subsequently connected to primary trigger logic unit 54. Output 57 of primary trigger logic unit 54 is configured to output a logical true state when a predetermined trigger condition is met. In one implementation primary trigger logic unit 54 performs a logical OR operation such that its output 57 causes delay unit 56 to generate a logical true output pulse at 58 a fixed time, determined by the delay period of delay unit 56, after any one of the monostables in pulse shortening unit 51 meet its threshold condition. In this way delay unit 56 is configured to generate a logical true output pulse a fixed time after a single photon is detected in any one of the pixel cells within optical detector pixel array 41. In another implementation primary trigger logic 54 may comprise any combination of logic which causes output 57 to be in a logical true state when the threshold condition for monostables 52, 53 in pulse shortening unit 51 is met for any predetermined selection of pixel cells within optical detector pixel array 41. In this way delay unit 56 may be configured to generate a logical true output pulse at output 58 a fixed delay period, determined by the delay period of delay unit 56, after any number, n, of optical photons are detected by pixel cells within optical detector pixel array 41. The logical true output pulse is thus created a fixed delay period after the $n^{th}$ optical photon has been detected, or after the $n^{th}$ pixel cell has been triggered.

If, within the delay period of delay unit 56, output 59 of secondary trigger logic unit 55 is subsequently set into a true state, output 64 of AND logic 50 causes the TDC to generate a timestamp. Since the time of the timestamp is determined by the time at which the $n^{th}$ optical photon or $n^{th}$ pixel cell was triggered plus the delay period of delay unit 56, the time at which the $n^{th}$ optical photon was detected or the $n^{th}$ pixel cell was triggered can be determined by subtracting the delay period of delay unit 56 from the time of the timestamp. This has useful application in PET imaging in improving the repeatability of timing measurements.

Secondary trigger logic unit 55 receives electrical signals from one or more row trigger outputs 48, 49. Its output 59 is configured to be in a logical true state when a predetermined logic condition for row trigger outputs 48, 49 is met. This condition may correspond to for example the pixel cell triggering rate exceeding, being less than, being within a predetermined range of, or being equal to a predetermined rate. In this way a timestamp is generated based on a pixel cell triggering rate. In one implementation secondary trigger logic 55 is configured to generate a logical true signal at output 59 when the total number of row trigger outputs 48, 49 in a logical true state exceeds a predetermined number which is greater than that which causes primary trigger logic unit 54 to set its output 54 into a logical true state. The number of row trigger outputs 48, 49 required to set secondary trigger logic output 59 into a logical true state may be for example two or more. The delay period in delay unit 56 determines the time period during which the pixel cell triggering rate is determined. The pixel cell triggering rate is determined by computing the difference between the threshold number of triggered pixel cells required to set secondary trigger logic unit 55 into a true state, and that required to set primary trigger logic unit 54 into a true state, within the delay period of delay unit 56. For example, setting the threshold to the number of pixel cells required to set output 57 of primary trigger logic unit 54 in to a logical true state to one, and setting the number of pixel cells required to set output 59 of secondary trigger logic unit 55 into a logical true state to two, and setting the delay period of delay unit 56 to 100 ps, results in a threshold pixel cell triggering rate of one triggered pixel cell per 100 ps, corresponding to one optical photon per 100 ps. Pixel cells in pixel cell rows 42, 43 may be reset subsequent to output 57 of primary trigger logic unit 54, or subsequent to output 64 of AND logic 50 in order to prepare the pixels in optical detector pixel array 41 for generating the next timestamp. In this way, at the end of the delay period, output 58 of delay unit 56 causes TDC 44 to generate a timestamp when the pixel cell triggering rate within optical detector pixel array 41 exceeds a predetermined rate, thus when the optical photon detection rate exceeds a predetermined rate. Furthermore in this configuration the time of the timestamp corresponds to the time at which the first pixel cell was triggered plus the delay period of delay unit 56, permitting subsequent computation of the time of detection of the first triggered pixel cell. More generally, by adjusting the threshold to or the range of the number of pixel cells required to set output 57 of primary trigger logic unit 54 into a true logic state, and likewise adjusting that required to set output 59 of secondary trigger logic unit 55 into a true logic state, a timestamp may be generated following the meeting of other pixel cell triggering rate-based conditions. Clearly at least one pixel cell must be triggered in order for primary trigger logic unit 54 to sets its output into a high state. However, in addition to the above described pixel cell triggering rate condition, the generation of a timestamp may furthermore be made conditional to the prior detection of a threshold number of triggered pixel cells by adjusting the condition for primary trigger logic unit 54 to set its output into a logical true state. In this way the time of the timestamp is the delay period of delay unit 56 after the meeting of the input condition for primary trigger logic unit 54. In this way the circuit in FIG. 4 may be configured to generate a timestamp corresponding to the time of detection of the $n^{th}$ optical photon plus the delay period of delay unit 56, wherein the timestamp is conditional upon the initial detection of n triggered optical photons and the subsequent meeting of a pixel cell triggering rate condition. Such an implementation advantageously improves the rejection of noise by generating a timestamp based on the profile of detected optical photons.

The pulse period for monostables in pulse shortening unit 51 in FIG. 4 is desirably shorter than the delay period of delay unit 56 in order to prevent overlapping trigger pulses at the inputs to primary trigger logic unit 54. Preferably the delay period of delay unit 56 is made as short as possible in order to rapidly discriminate between dark count noise and electrical signals indicative of the reception of a gamma photon. Improved timing performance has been found throughout the following series of ranges for the delay period in delay unit 56: the range 0.001 ns to 200 ns, the range 0.001 ns to 20 ns, the range 0.001 ns to 10 ns, the range 0.001 ns to 1 ns. When compared to the prior art, improved noise discrimination is provided by the timing scheme exemplified by FIG. 4 because a timestamp is not generated unless the pixel cell triggering rate, thus the optical photon detection rate, meets a predetermined rate condition. Advantage is taken of the observation that the optical photon detection rate differs more markedly for noise and for a real scintillation light pulse resulting from the detection of a gamma photon than does the total number of pixel cells that are triggered in each case.

As stated, the configuration in FIG. 4 may be adapted such that the first optical photon produced by a gamma photon primes AND logic 50, and providing, within the delay period of delay unit 56, that the rate of optical photon generation in scintillator element 40 is subsequently sufficient to cause secondary trigger logic 55 to be in a logical true state, a timestamp is generated by TDC 44. The time of detection of the first optical photon may therefore be determined by subtracting the delay period of delay unit 56 from the time of the timestamp. The configuration may also be adapted such that the $n^{th}$ optical photon primes AND logic 50 via delay unit 56, and such that k or more optical photons, where k exceeds n, set secondary trigger logic unit 55 into a true logic state. Thus a timestamp is generated at a time determined by the delay period after the detection of the $n^{th}$ optical photon, providing the rate condition determined by (k−n) optical photons per period of time determined by the delay period, is exceeded. The threshold optical photon detection rate required to generate a timestamp may be adjusted via i) the delay period of delay unit 56 ii) the threshold number of pixel cells that must be set into a logical true state in order to trigger each monostable in pulse shortening unit 51, iii) the threshold number of pixel cells that must be set into a logical true state in order to cause a change in the output of primary trigger logic unit 54, or iv) the threshold number of pixel cells that must be set into a logical true state in order to cause a change in the output of secondary trigger logic unit 55. Increasing the threshold optical photon detection rate required to generate a timestamp in general reduces the susceptibility to false triggering of the TDC by dark count noise. Making the threshold rate excessively high reduces the sensitivity to scintillation light pulses resulting from gamma photons since some light pulses will be missed.

In one example implementation, the system in FIG. 4 is configured such that the first optical photon primes AND logic 50 via primary trigger logic 54 and the secondary trigger logic 55 is configured to cause AND logic 50 to cause TDC 44 to generate a timestamp at a higher trigger level, thus when a higher number of optical photons have been subsequently detected within the delay period of delay unit 56. A typical scintillator element material, LYSO, produces approximately 2000 photons in response to the reception of a single gamma photon at 511 keV. These are subject to a decay time of approximately 40 ns in LYSO and lead to an initial optical photon flux of 50 photons/ns. Significant noise discrimination can be provided by setting delay unit 56 to have a delay period of 1 ns in which case output 59 of secondary trigger logic 55 should be configured to be in a logical true state when the detected photon flux exceeds approximately 5 photons/ns.

Optional validation logic unit 46 in FIG. 4 includes logic circuitry which receives signals from row trigger outputs 48, 49 indicative of the detection of optical photons in pixel cell rows 42, 43 in order to determine whether these signals originated from a gamma photon. Optional validation logic unit 46 may thus be configured to generate a true signal at validation output 60 when a predetermined number of row trigger outputs 48, 49 in optical detector pixel array 41 have been set into a true state indicative of the detection of one or more optical photons by pixel cells in a corresponding pixel cell row 42, 43. The threshold number of pixel cells required to change the state of validation output 60 is preferably set to a higher number than that required by trigger logic unit 45 to cause TDC 44 to generate a timestamp. In this way, validation logic unit 46 can be used to provide additional discrimination against noise which typically sets a low total number of pixel cells within optical detector pixel array 41 into a true state, and a scintillation light pulse resulting from the reception of a gamma photon by scintillator element 40 which sets a much higher total number of pixel cells within optical detector pixel array 41 into a true state. If optional validation logic unit 46 confirms that the predetermined number of row trigger outputs 48, 49 have been set into a true state, the scintillation light pulse is interpreted as originating from a gamma photon and validation output 60 causes TDC 44 to output the timestamp to control unit 33. The timestamp which was produced when triggered by trigger logic unit 45 is then transferred to control unit 33 from a register (not shown). If optional validation logic unit 46 does not confirm that the predetermined number of row trigger outputs 48, 49 have been set into a true state then the timestamp is not transferred to control unit 33 and the TDC 44 and integrator unit 47 are reset via control unit 33.

Preferably the predetermined number of row trigger outputs 48, 49 required to set the output of optional validation logic unit 46 into the valid state are such that a true validation output 60 is generated in response to a scintillation light pulse within approximately 10 ns of a logical true signal at trigger connection 64. In this way, if noise causes TDC 44 to generate a timestamp its reset may be initiated within 10 ns and therefore without too long a delay.

Optional integrator unit 47 in FIG. 4 may be used to determine the energy of each received gamma photon by integrating the scintillation light produced in response to its reception. The energy of each gamma photon is a parameter that may be used in high energy physics applications such as PET imaging in which it can be used by a coincidence determination unit to improve the discrimination between scattered and non-scattered gamma photons and thereby determine the validity of a line of response from timewise coincident gamma photons. Integrator unit 47 may thus be configured to generate a signal indicative of the total amount of scintillation light detected by the pixel cells within optical detector pixel array 41. The integration may be performed by intermittently transferring the logical output of pixel cells in pixel cell rows 42, 43 to integrator unit 47 in a multiplexed fashion and summing the number of pixel cells in a logical true state. The integration by integrator unit 47 may be initiated via control unit 33 when trigger logic unit 45 causes TDC 44 to generate a timestamp.

Optional control unit 33 in FIG. 4 may coordinate the various operations described above, and may further receive timestamps from TDC 44, and further to control their transfer to coincidence determination unit 29 within PET imaging system 20 illustrated in FIG. 1.

Figure 5:
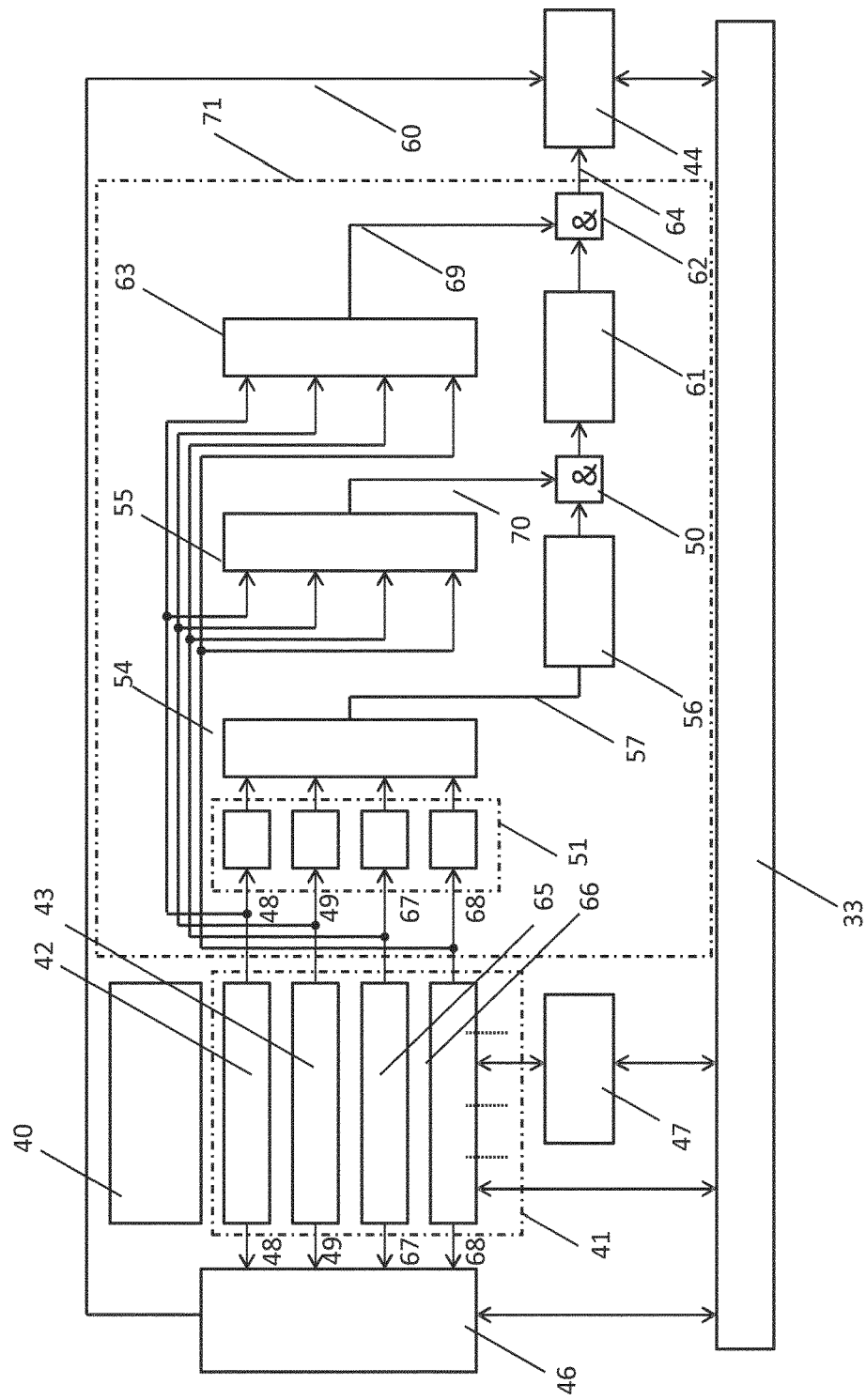
FIG. 5 illustrates a second embodiment of a timing unit and timestamp trigger unit in accordance with certain aspects of the invention

FIG. 5 illustrates a second embodiment of a timing unit and timestamp trigger unit in accordance with certain aspects of the invention. The embodiment in FIG. 5 is configured to generate a timestamp following the meeting of both a first pixel cell triggering rate condition and the subsequent meeting of a second pixel cell triggering rate condition. Improved noise rejection is provided by the requirement that the triggering rate conditions are met at subsequent points in time before the timestamp is generated. This allows for the generation of a timestamp based on the profile of the scintillation light's optical photon detection rate. This way, the timing unit, implemented by exemplary TDC 44 is not started until there is an even higher probability that the electrical signals from pixel cells within the optical detector pixel array result from scintillation light. This avoids the deadtime associated with the resetting a timing unit following it being caused to generate a timestamp by noise. As with the first embodiment illustrated in FIG. 4 it is to be appreciated that the timing unit implemented by exemplary TDC 44 may alternatively be implemented by another timing unit such as an analogue timing unit.

In addition to the items of FIG. 4, FIG. 5 includes tertiary trigger logic unit 63 which receives electrical signals from one or more row trigger outputs 48, 49, 67, 68. Its output 69 is configured to be in a logical true state when the number of pixel cells triggered within a delay period determined by delay unit 61 meets a predetermined count condition; thus the pixel cell triggering rate meets a predetermined rate condition as earlier described with reference to FIG. 4. Output 69 of tertiary trigger logic unit 63 in FIG. 5 may be configured to be in a logical true state when any number of optical photons are detected by pixel cells within optical detector pixel array 41. Furthermore this output may be configured to be in a logical true state when this number is equaled, exceeded, not exceeded or is within a predetermined range. In this way a timestamp may be issued by TDC 44 dependent upon whether the pixel cell triggering rate determined by tertiary trigger logic 63 in combination with delay unit 61 is greater than, less than, equal to, or is within a predetermined range of a predetermined rate. Second delay unit 61 in FIG. 5 operates in the same manner as delay unit 56 in FIG. 4. Pixel cells in pixel cell rows 42, 43, 65, 66 may be reset subsequent to output 57 of primary trigger logic unit 54, or subsequent to output 64 of AND logic 62 in order to prepare the pixels in optical detector pixel array 41 for generating the next timestamp. Additional AND logic 62 is also included in the embodiment in FIG. 5. Whilst additional pixel cell rows 65, 66 and their corresponding outputs are also illustrated in FIG. 5 in order to illustrate the possibility of scaling the circuit to larger numbers of optical detector pixels it is to be appreciated that the circuit may be adapted to operate with one or more such pixel cell rows wherein each row includes one or more pixel cells.

The embodiment in FIG. 5 may be configured to take advantage of the observation that a scintillation light pulse generated in a scintillator element 40 following the reception of a gamma photon is typically characterized by a rapid initial optical photon detection rate followed by a reduction in the optical photon detection rate. Such a profile is typical of a scintillation light pulse from a gamma photon in a PET imaging system in which a rapid initial increase in scintillation light is followed by an exponential decay. The decay constant may be in the order of 40 ns. By contrast the profile from dark count noise, which is randomly generated, results in a more uniform pixel cell triggering rate. Optical photons from for example Cherenkov radiation may be directly detected in the same way as described above although in the absence of scintillator element 40. These characteristic differences in the pixel cell triggering rate may be exploited in the second embodiment illustrated in FIG. 5 by making the threshold pixel cell triggering rate required to set output 70 of secondary trigger logic 55 dependent upon a particular rate being exceeded, and the threshold pixel cell triggering rate required to set output 69 of tertiary trigger logic 63 dependent upon a particular rate being exceeded, not exceeded or within a narrow range. In the latter example this may be achieved with the system illustrated in FIG. 5 by arranging that the number of row trigger outputs 42, 43, 65, 66 required to cause output 69 of tertiary trigger logic 63 to be in a logical true state is within a narrow range centered about a number that is lower than that required to cause output 70 of secondary trigger logic 55 to be in a logical true state. In this way the generation of a timestamp can be made dependent upon an initial pixel cell triggering rate being exceeded and a subsequent pixel cell triggering rate being within a lower and predetermined range. By adjusting the threshold triggering rate condition set by secondary trigger logic 55 and tertiary trigger logic 63, the generation of a timestamp can be made dependent upon any desired profile of pixel cell triggering rate, thus optical photon generation rate, determined at two points in time.

In one example implementation of the embodiment shown in FIG. 5, the monostables in pulse shortener unit 51 each have a period of 0.5 ns, delay unit 56 has a delay period of 1 ns and delay unit 61 has a delay period of 10 ns. Furthermore output 57 of primary trigger logic 54 is configured to be in a logical true state when any one of its inputs from pulse shortener unit 51 are in a logical true state. Output 59 of secondary trigger logic unit 55 is configured to be in a logical true state when the number of triggered cells in optical detector pixel array 41 during the 1 ns delay period of delay unit 56, thus the pixel cell triggering rate, corresponds to a gamma photon reception rate exceeding $10^6$ counts per second. Output 69 of tertiary trigger logic unit 63 is configured to be in a logical true state when the number of triggered cells in optical detector pixel array 41 during the 10 ns period of delay unit 61, thus the pixel cell triggering rate, corresponds to a gamma photon reception rate exceeding $10^5$ counts per second. Pulse shortener unit 1 receives signals from row trigger outputs 48, 49, 67, 68 which correspond to all pixel cell rows 42, 43, 65, 66 in optical detector pixel array 41. In this way when any one of the pixel cells within optical detector pixel array 41 is set into a logical true state the output of primary trigger logic 54 is set into a logical true state for a period of 0.5 ns. This corresponds to the triggering of output 57 of primary trigger logic 54 by the first optical photon. Delay unit 56 delays the propagation of this pulse to AND logic 50 for a delay period of 1 ns. Meanwhile secondary trigger logic unit 55 determines whether the row trigger outputs 48, 49, 67, 68 at its input meet its predetermined rate condition corresponding to a gamma photon reception rate exceeding $10^6$ counts per second. If this condition is met within the 1 ns delay period of delay unit 56 then its output 70 is set into a logical true state, which at the end of the 1 ns delay period of delay unit 56 causes a logical true output from AND logic 50. Delay unit 61 delays the propagation of this pulse to AND logic 62 for a delay period of 10 ns. Meanwhile tertiary trigger logic unit 63 determines whether within this second 10 ns delay period the row trigger outputs 48, 49, 67, 68 at its input meet its predetermined rate condition corresponding to a gamma photon reception rate exceeding $10^5$ counts per second. If this condition is met within the 10 ns period of delay unit 61 then its output 69 is set into a logical true state, which at the end of the 10 ns period of delay unit 61 causes a logical true output at TDC trigger connection 64, the output from AND logic 62 thereby causing TDC 44 to generate a timestamp. In this way the generation of the timestamp is dependent upon the meeting of the first and the second pixel cell triggering rate conditions in succession; thus when there is an even higher level of confidence that the triggering of pixel cells within optical detector pixel array 41 originated from a scintillation light pulse. Clearly other configurations of primary, secondary and tertiary trigger logic units 54, 55, and 63, and alternative logical embodiments of AND logic 50 and 62, and alternative delays in delay units 56 and 61 may be used in order to set the first and the second pixel cell triggering rate conditions to any rate desired. The pixel cells in optical detector pixel array may be reset subsequent to either of outputs 57, 70 or 69 or 64 becoming set into the true logic state in order to prepare the pixel cells for generating the next timestamp. By making the described logic circuitry programmable the configuration may further be reconfigured for example between or during the use of the circuit in the execution of a PET imaging scan. In so doing the system can be reconfigured to adjust both sensitivity and noise rejection during use.

As described with reference to the first embodiment, optional integrator unit 47 illustrated in FIG. 5 may further integrate the scintillation light from a received gamma photon. As also described in the first embodiment, optional validation logic unit 46 may provide further discrimination against noise by controlling the output of the timestamp to control unit 33 from TDC 44, or its rejection, based on a total number of triggered pixel cells within optical detector pixel array 41. Optional control unit 33 may further coordinate the various described processes.

According to a third embodiment, the first embodiment illustrated in FIG. 4 is further supplied with second TDC similar in operation to TDC 44 and referred-to hereinafter as a reference time-to-digital converter (RTDC). The RTDC is configured to receive electrical signals from output 57 of primary trigger logic unit 54 and to generate a second timestamp when this output makes a transition from a logical false state to a logical true state. In this way a timestamp is not only generated when the triggering rate condition for the secondary trigger logic unit is met, but a second timestamp is also generated when the condition for primary trigger logic unit 54 is met. The second timestamp relating to the condition for primary trigger logic unit 54 is indicative of the time of detection of a particular number of optical photons, rather than indicative of a particular optical photon detection rate condition. A timestamp generated by the RTDC can be used to provide information relating to the shape of the scintillation light pulse that triggered primary trigger logic 54. This pulse shape information can be subsequently used to perform a time walk correction or to estimate the depth of interaction of a gamma photon in scintillator element 40 and thereby improve the spatial resolution of detection of the original gamma photon. This depth of interaction can subsequently be used in a PET imaging system to further improve the spatial resolution of determining coincident pairs of gamma photons as it allows for discrimination based on the angle of incidence of a gamma photon. This information can be compared for two apparently coincident gamma photons in order to reject gamma photons that appear coincident but which, due to their incidence angles, are actually the subject of a parallax error. Whilst the second timestamp produced by the RTDC is subject to a higher risk of false triggering than that produced by TDC 44 and it therefore misses more of the valid gamma photons than TDC 44, when generated in combination with a timestamp from TDC 44 the combined data can be used in this way to improve the spatial resolution of the imaging system. As described above, the trigger logic units 54 and 55 may be made programmable in order that the sampling of characteristics of the scintillation light pulse from a number of points in time is possible. The circuit described in this third embodiment may also be adapted by including additional trigger logic units, each with a corresponding time to digital converter in order to either generate additional timestamps at different times throughout the scintillation light pulse, or as a precondition for TDC 44 generating a timestamp. Additional timestamps can be used to improve the determination of the shape of the scintillation light pulse and thereby provide an even more accurate time walk correction, reduce timing jitter, or improved an estimate of the depth of interaction. When used as a precondition for TDC 44 to generate a timestamp the resulting timestamp has the benefit of being generated with an even higher probability of the electrical signals from the pixel cells originating from a gamma photon.

In an example implementation of the third embodiment, the system in FIG. 4 is configured such that the first detected optical photon causes output 57 of primary trigger logic 54 to be in a logical true state, and such that secondary trigger logic 55 causes AND logic 50 to cause TDC 44 to generate a timestamp when the pixel cell triggering rate for pixel cells within optical detector pixel array 41 exceeds the expected initial rate from a gamma photon. This rate could be for example 50 optical photons/ns. Delay unit 56 may be configured to have a delay period of for example 1 ns. The RTDC, receiving electrical signals from output 57 of primary trigger logic unit 54 is therefore configured to generate a timestamp when the first optical photon is detected. When the timing is accurate the time difference between the RTDC timestamp and the TDC timestamp would be expected to be equal to that of delay unit 56 added to the risetime of the scintillation light pulse, thus approximately 1 ns. However if this is not the case then a timewalk correction can be performed by multiplying the clock period of the TDC by a scaling factor in order that this is the case. Furthermore a depth of interaction calculation for a radiation quant in the scintillator element may be performed in order to improve the spatial resolution of a PET imaging system. A depth of interaction calculation may be performed by a depth-of-interaction calculation unit configured to compute a depth of interaction using a lookup table or a statistical function relating time differences to a depth of interaction in the scintillator element. Such a lookup table or statistical function may be generated from heuristic or simulated time difference information based on the geometry of the scintillator element.

According to a fourth embodiment, the second embodiment illustrated in FIG. 5 is further supplied with second TDC referred-to hereinafter as a reference time-to-digital converter (RTDC), and a third TDC; both additional TDCs being similar in operation to TDC 44. The second TDC, or RTDC, is configured to receive electrical signals from output 57 of primary trigger logic unit 54 and to generate a second timestamp when a signal at this output makes a transition from a logical false state to a logical true state. The third TDC is configured to receive electrical signals from output 70 of secondary trigger logic unit 55 and to generate a third timestamp when this output makes a transition from a logical false state to a logical true state. In this way three timestamps are generated following the reception of a gamma photon. A first timestamp is generated by TDC 44 when the triggering conditions for the primary, secondary and tertiary trigger logic units 54, 55, and 63 respectively have been met. In practice this is the last of the three timestamps to be generated. A second timestamp is generated when the condition for primary trigger logic unit 54 is met. The second timestamp is indicative of the detection of a particular number of optical photons. The third timestamp relates to the condition for secondary trigger logic unit 55 and is indicative that a predetermined pixel cell triggering rate for pixel cells within optical detector pixel array 41 has been met. The additional second and third timestamps provide further information relating to the shape of the scintillation light pulse that triggered primary trigger logic 54. As with the third embodiment this pulse shape information may subsequently be used to perform a time walk correction or to estimate the depth of interaction of the gamma photon in scintillator element 40 and thereby improve the spatial resolution of detection of the original gamma photon. By making the trigger logic units programmable, a large variation of sampling points becomes possible with this configuration. The circuit described in this fourth embodiment may also be extended by adding one or more further trigger logic units, each with a corresponding time to digital converter in order to generate additional timestamps at different times throughout the scintillation light pulse. Such timestamps can likewise be used to improve the determination of the shape of a scintillation light pulse and thereby provide an even more accurate time walk correction or an improved estimate of the depth of interaction.

In an example implementation of the fourth embodiment, the circuit in FIG. 5 is configured such that the monostables in pulse shortener unit 51 each have a period of 0.5 ns, delay unit 56 has a delay period of 1 ns and delay unit 61 has a delay period of 10 ns. Furthermore output 57 of primary trigger logic 54 is configured to be in a logical true state when any one of its inputs from pulse shortener unit 51 are in a logical true state. Output 70 of secondary trigger logic unit 55 is configured to be in a logical true state when the number of pixel cells triggered in optical detector pixel array 41 during the 1 ns period of delay unit 56 corresponds to a gamma photon reception rate exceeding $10^6$ counts per second. Output 69 of tertiary trigger logic unit 63 is configured to be in a logical true state when the number of triggered cells in optical detector pixel array 41 during the 10 ns period of delay unit 61 corresponds to a gamma photon reception rate exceeding $10^5$ counts per second. Pulse shortener unit 1 receives signals from row trigger outputs 48, 49, 67, 68 which correspond to all pixel cell rows 42, 43, 65, 66 in optical detector pixel array 41. In this way when any one of the pixel cells within optical detector pixel array 41 is set into a logical true state the output of primary trigger logic 54 is set into a logical true state for a period of 0.5 ns. This corresponds to the triggering of output 57 of primary trigger logic 54 by the first detected optical photon. The reference TDC (not shown) connected to output 57 thus generates a timestamp when this condition is met. The output of secondary trigger logic unit 55 is configured to be in the logical true state when the pixel cell triggering rate for pixel cells within optical detector pixel array 41 corresponds to a gamma photon reception rate exceeding $10^6$ counts per second. A third TDC (not shown) thus generates a timestamp when this condition is met. Finally providing the condition for tertiary trigger logic 63 is met, thus the gamma photon reception rate exceeds $10^5$ counts per second, TDC 44 generates a timestamp. In this way the reception of a gamma photon results in the generation of three timestamps in succession which may be used to improve the determination of the shape of the scintillation light pulse and thereby provide an even more accurate time walk correction or an improved estimate of the depth of interaction.

To summarize, a timing unit and a timestamp trigger unit for timestamping detected radiation quanta with improved noise rejection has been described with particular reference to a PET imaging system. The invention has further application in the detection of radiation quanta in high energy particle physics applications as well as in the direct detection of radiation quanta in the form of optical photons such as Cherenkov radiation. Improved noise rejection is achieved by the cooperation in which the timestamp trigger unit causes the timing unit to generate a timestamp based on a pixel cell triggering rate for pixel cells within an optical detector pixel array. Improved timing resolution is achieved by the disclosed invention whose improved noise rejection permits the generation of a timestamp following the detection of fewer optical photons. The cooling requirements of the optical detectors are also alleviated owing to the improved noise rejection and the reduction in the false triggering rate, enabling their operation at closer to room temperature.

Whilst the invention has been illustrated and described in detail in the drawings and foregoing description, such illustrations and description are to be considered illustrative or exemplary and not restrictive; the invention is not limited to the disclosed embodiments and can be used for timing the detection of radiation quanta in various applications within the field of high energy particle physics.

The invention claimed is:

1. A radiation detection device comprising:
   an optical detector pixel array having one or more pixel cells which can be triggered by optical photons;
   a timestamp trigger unit in operative communication with at least one timing unit;
   wherein the timestamp trigger unit is configured to receive signals from the optical detector pixel array and is further configured to determine at least a first pixel cell triggering rate for the one or more pixel cells within the optical detector pixel array;
   wherein the at least a first pixel cell triggering rate is determined by computing the number of triggered pixel cells within the optical detector pixel array within a predetermined delay period;
   wherein the timestamp trigger unit is configured to cause the at least one timing unit to generate a first timestamp indicative of the end of the predetermined delay period based on the at least a first pixel cell triggering rate for the one or more pixel cells within the optical detector pixel array and based further on a second pixel cell triggering rate for the one or more pixel cells within the optical detector pixel array and wherein the second pixel cell triggering rate is determined at a later point in time to the first pixel cell triggering rate.

2. The radiation detection device according to claim 1 wherein the timestamp trigger unit is configured to cause the at least one timing unit to generate the first timestamp if the at least a first pixel cell triggering rate for the one or more pixel cells within the optical detector pixel array exceeds a threshold rate value.

3. The radiation detection device according to claim 1 wherein the first timestamp is generated based further upon a triggered pixel cell count for the one or more pixel cells within the optical detector pixel array;
   wherein the first timestamp is generated if the triggered pixel cell count meets a predetermined triggered pixel cell count condition prior to the at least a first pixel cell triggering rate meeting a predetermined pixel cell triggering rate condition.

4. The radiation detection device according to claim 3 wherein the predetermined triggered pixel cell count condition is that the triggered pixel cell count exceeds a threshold count value;
   and wherein the predetermined pixel cell triggering rate condition is that the at least a first pixel cell triggering rate exceeds a threshold rate value;
   and wherein the predetermined delay period begins when the triggered pixel cell count exceeds the threshold count value;
   such that the at least one timing unit is caused to generate the first timestamp if the triggered pixel cell count exceeds the threshold count value and then subsequently exceeds a higher count value before the end of the predetermined delay period such that the threshold rate value is exceeded.

5. The radiation detection device according to claim 3 further comprising a timestamp adjustment unit configured to receive the first timestamp from the at least one timing unit;
   wherein the timestamp adjustment unit is configured to generate an adjusted first timestamp indicative of the time at which the predetermined triggered pixel cell count condition was met by subtracting the predetermined delay period from the time of the first timestamp.

6. The radiation detection device according to claim 1 wherein the timestamp trigger unit is configured to cause the at least one timing unit to generate the first timestamp if the first pixel cell triggering rate for the one or more pixel cells within the optical detector pixel array exceeds a first threshold rate and the second pixel cell triggering rate for the one or more pixel cells within the optical detector pixel array exceeds a second threshold rate.

7. The radiation detection device according to claim 1 further comprising at least a second timing unit;
   wherein the at least a second timing unit is in communication with the timestamp trigger unit;
   wherein the timestamp trigger unit is further configured to cause the at least a second timing unit to generate a photon count timestamp indicative of the time of detection of one or more optical photons by pixel cells within the optical detector pixel array.

8. A PET imaging system comprising a plurality of radiation detection devices according to claim 7;

wherein each radiation detection device further comprises a scintillator element in optical communication with the optical detector pixel array;

the PET imaging system further comprising:

a depth-of-interaction calculation unit;

wherein the depth-of-interaction calculation unit is configured to compute a depth of interaction of a radiation quant in the scintillator element based on either i) the time difference between the first timestamp and the photon count timestamp or ii) the time difference between the first timestamp and the triggering rate timestamp.

9. A PET imaging system comprising a plurality of radiation detection devices according to claim 7;

wherein each radiation detection device further comprises a scintillator element in optical communication with the optical detector pixel array;

the PET imaging system further comprising a timestamp correction unit configured to generate a corrected timestamp based on a weighted average of the first timestamp and the second timestamp.

10. The radiation detection device according to claim 1 further comprising at least a second timing unit;

wherein the at least a second timing unit is in communication with the timestamp trigger unit;

wherein the timestamp trigger unit is further configured to cause the at least a second timing unit to generate a triggering rate timestamp indicative of the time at which the pixel cell triggering rate for the one or more pixel cells within the optical detector pixel array meets a second triggering rate condition.

11. A PET imaging system comprising a plurality of radiation detection devices according to claim 1;

wherein each radiation detection device further comprises a scintillator element in optical communication with the optical detector pixel array.

12. A timing method for use in PET imaging or Cherenkov imaging, the timing method comprising the steps of:

receiving signals from an optical detector pixel array indicative of the triggering of one or more pixel cells within the optical detector pixel array;

determining at least a first pixel cell triggering rate for the one or more pixel cells within the optical detector pixel array by computing the number of triggered pixel cells within the optical detector pixel array within a predetermined delay period;

generating a first timestamp that is indicative of the end of the predetermined delay period and is also indicative of the detection of a radiation quanta based on the at least a first pixel cell triggering rate for the one or more pixel cells within the optical detector pixel array and based further on a second pixel cell triggering rate for the one or more pixel cells within the optical detector pixel array and wherein the second pixel cell triggering rate is determined at a later point in time to the first pixel cell triggering rate.

13. A non-transitory computer-readable medium carrying executable instructions which control one or more processors to perform the method steps of:

receiving signals from an optical detector pixel array indicative of the triggering of one or more pixel cells within the optical detector pixel array;

determining at least a first pixel cell triggering rate for the one or more pixel cells within the optical detector pixel array by computing the number of triggered pixel cells within the optical detector pixel array within a predetermined delay period;

generating a first timestamp that is indicative of the end of the predetermined delay period and is also indicative of the detection of a radiation quanta based on the at least a first pixel cell triggering rate for the one or more pixel cells within the optical detector pixel array and based further on a second pixel cell triggering rate for the one or more pixel cells within the optical detector pixel array and wherein the second pixel cell triggering rate is determined at a later point in time to the first pixel cell triggering rate.

14. The non-transitory computer-readable medium according to claim 13 wherein the computer executable instructions are further configured to perform the method step of:

generating an adjusted first timestamp by subtracting the predetermined delay period from the time of the first timestamp.

15. A radiation detection device comprising:

an array of pixel cells, each pixel cell being configured to be triggered by an optical photon to output a pulse signal;

a programmable logic circuit configured to:
  receive the pulse signals from the pixel cells,
  determine at least a first pixel cell triggering rate for the pixel cells by counting triggered pixel cells in a first period,
  after determining the first pixel cell triggering rate, determine a second pixel cell triggering rate including determining a number of pulse signals from the end of the first period to a predetermined subsequent tune, and
  generate a time stamp based on the first and second pixel cell triggering rates.

* * * * *